US012633194B2

(12) United States Patent
Scharold et al.

(10) Patent No.: US 12,633,194 B2
(45) Date of Patent: May 19, 2026

(54) METHOD FOR A GAMING SYSTEM

(71) Applicant: Play'n Go Marks Ltd, Valletta (MT)

(72) Inventors: Walter Scharold, Valletta (MT); Dominik Luczo, Valletta (MT)

(73) Assignee: PLAY'N GO MARKS LTD, Valletta (MT)

( * ) Notice: Subject to any disclaimer, the term of this patent is extended or adjusted under 35 U.S.C. 154(b) by 264 days.

(21) Appl. No.: 18/388,565

(22) Filed: Nov. 10, 2023

(65) Prior Publication Data

US 2024/0169791 A1 May 23, 2024

(30) Foreign Application Priority Data

Nov. 18, 2022 (SE) .................................... 2251352-7

(51) Int. Cl.
*G07F 17/32* (2006.01)

(52) U.S. Cl.
CPC ................................ *G07F 17/3225* (2013.01)

(58) Field of Classification Search
CPC .................................................. G07F 17/3225
See application file for complete search history.

(56) References Cited

U.S. PATENT DOCUMENTS 7,288,028 B2 * 10/2007 Rodriquez ............ A63F 13/795 463/40
2002/0119818 A1 8/2002 Savio et al.
2007/0167235 A1 * 7/2007 Naicker .............. G07F 17/3244 463/42
2008/0015006 A1 * 1/2008 George ................... G07F 17/32 463/17
2009/0181774 A1 * 7/2009 Ratcliff ................... A63F 13/12 463/42
2012/0083343 A1 * 4/2012 Wu ..................... G07F 17/3286 463/42
2013/0059656 A1 * 3/2013 Kim ........................ A63F 13/79 463/29
2013/0331167 A1 * 12/2013 Meistrich ................ G07F 17/34 463/20
2014/0073434 A1 * 3/2014 Yukishita ................ A63F 13/10 463/42
2015/0065243 A1 * 3/2015 Mizrahi .............. A63F 13/5258 463/31
2016/0364948 A1 12/2016 Parviainen et al.
2017/0316651 A1 11/2017 Wortmann et al.
2018/0286183 A1 10/2018 Davis et al.
2018/0357861 A1 12/2018 Cormack
2021/0049861 A1 2/2021 Sahl

FOREIGN PATENT DOCUMENTS

CA 2787610 A1 2/2014

OTHER PUBLICATIONS

Swedish Search Report dated May 16, 2023 for Swedish Application No. 2251352-7, 2 pages.
Extended European Search Report dated Jan. 17, 2024 for EP Application No. 23205995.6, 7 pages.

* cited by examiner

*Primary Examiner* — Jeffrey K Wong
(74) *Attorney, Agent, or Firm* — RMCK Law Group, PLC

(57) ABSTRACT

The present disclosure relates to a computer implemented method performed by a gaming system. In particular, the present disclosure relates to a scheme for further improving a randomness in a game provided by means of the gaming system. The present disclosure also relates to a corresponding gaming system and a computer program product.

11 Claims, 5 Drawing Sheets

METHOD FOR A GAMING SYSTEM

CROSS-REFERENCE TO RELATED APPLICATIONS

This application claims priority to Swedish Patent Application No. 2251352-7, filed on Nov. 18, 2022. The disclosure of the above application is hereby incorporated by reference in its entirety.

TECHNICAL FIELD

The present disclosure relates to a computer implemented method performed by a gaming system. In particular, the present disclosure relates to a scheme for further improving a randomness in a game provided by means of the gaming system. The present disclosure also relates to a corresponding gaming system and to a computer program product.

BACKGROUND

Games of chance are known and widely played for recreational purposes. The gaming industry has come to recognize that to sustain long term success it must be constantly innovative in introducing new games and new gaming concepts to the gaming public. One example of this innovating drive can be appreciated in the embrace of the Internet and online gaming by the gaming industry.

A common trend within the online gaming industry is to provide potentially new and current players with new means for attracting and ensuring that players remain at the online site, controlled by a gaming operator, providing the games. An example of such a means is the introduction of further unexpected scenarios in the game, potentially allowing a player to be further driven to play the game since the player has a desire to participate with the game in case of such an unexpected scenario appearing.

The introduction of possible unexpected scenarios in the game could also further increase the payout to the player, since the unexpected scenario possibly could add a further leverage to a bet placed by the player. Although this of course is of high interest to the player, such further possible payouts must be closely controlled by a gaming operator, ensuring that the payouts stay within desired boundaries. Thus, there is a general need to balance the attraction power of the game by means of possible further and higher payouts, while at the same time ensuring that an operator is in total control of the game.

Further attention is drawn to US20160364948A1, presenting a method of presenting a game at a gaming machine, wherein the method includes accepting a wager from a player via the wager accepting device, displaying a plurality of symbols in an array of symbols on the electronic display, the array of symbols comprising symbol positions aligned in rows and columns, and determining whether two or more of the plurality of symbols displayed in the array of symbols are the same symbol and are disposed adjacent to one another defining a common symbol block.

SUMMARY

According to an aspect of the present disclosure, the above is at least partly met by a computer implemented method performed by a gaming system, the gaming system comprising a server arranged in communication with an electronic user device using a network connection, the electronic user device comprising a display screen, wherein the method comprises the steps of forming, at the server, a table having a predetermined dimension and comprising a corresponding number of cells, generating, at the server, a set of elements corresponding to the number of cells of the table, wherein the set of elements are selected from a group of predefined element types, and each of the predefined element types include at least one segment providing a path within the cell, populating, at the server, the cells of the table with the set of elements, directing, using the server, the electronic user device to display the table at the display screen, analyzing, at the server, the populated table to identify if there exist a continuous path connecting at least two adjacently arranged cells of the table, determining, at the server and if a continuous path has been identified, a gaming outcome based on a combined segment length of the continuous path determined by applying a predefined segment length determination scheme, and directing, using the server, the electronic user device to display the gaming outcome.

Generally, when the operational scheme according to the present disclosure is applied to a game concept provided by the server, it may be possible to increase the randomization of the game, thus potentially allowing for increasing winning possibilities for a player participating in the game. An advantage following such a possibility is an improved attraction power to the game, thus potentially allowing for the player to remain playing the game for an increased duration as compared to previously known similar operational schemes. This could potentially be beneficial to both the player participating in the game and the gaming operator providing the game.

Additionally, allowing for an increased randomization of the game may potentially further increase the security of the game, since known general computer-based issues relating to the generation of randomized material to the game are minimized.

Furthermore, the operational scheme according to the present disclosure uniquely capitalizes on server-side computational resources to handle both data processing and bandwidth optimization. By streamlining the server algorithms, the system not only reduces computational overhead but also improves the use of network bandwidth. The processed game data is then efficiently transmitted to the electronic user device, ensuring a fluid and seamless gaming experience. This amalgamation of computational efficiency and bandwidth optimization serves a dual purpose: it expedites the gaming process for players while also conserving valuable server resources. Consequently, the system can accommodate a greater number of players without compromising on performance, potentially enhancing both the user experience and the game operator's revenue streams.

In accordance with the present disclosure, at least a portion of the gaming concept where the player is interacting involves engaging with a table comprising a plurality of cells, where the cells are arranged in lines and columns and where each of the cells is populated with an element. Such elements may for example include different types of elements, for example including numbers and/or symbols of any kind and matching a desired implementation of the game to be played by the player.

According to the present disclosure, each of the elements includes at least one segment providing a path within the cell. As an example, within the context of the present disclosure the segment will provide a path that may be seen as extending though a first cell. Thus, in case an adjacently arranged second cell has a segment that aligns with the segment of the first cell, then the two adjacently arranged cells (i.e. the first and the second cell) will together provide an extended path spanning through both of the first and the second cell, where the extended path includes the segment of the first cell and the segment of the second cell.

As defined in accordance with the present disclosure, the server is adapted to analyze the populated table to identify if there exist a continuous path connecting at least two adjacently arranged cells of the table. Within the context of the present disclosure, a continuous path is defined as a path where the combination of segments of at least two adjacently arranged cells "encircles" an area shared by the at least two adjacently arranged cells. Thus, a continuous path is not present in case segments from the first and the second cell solely extends through both of the first and the second cell without encircling an area shared by the first and the second cell.

As an example, two elements each solely comprising a straight segment (resulting in one segment in each of the first and the second cell) will not define as a continuous path within the context of the present disclosure. Conversely, if each of the elements of the first and the second cell comprises e.g. a segment shaped as a half circle, and the ends of the half circles in the first and the second cell faces each other, then a full circle will be formed, encircling an area shared by the first and the second cell. Consequently, such an example will provide for a continuous path within the meaning of the present disclosure.

Furthermore, the gaming system's ability to adapt the gaming outcome based on predefined segment length schemes adds a layer of user customization. This advantageously allows players to potentially influence the game's outcome, thus fostering a sense of agency and immersion. Possibly, such a feature may potentially result in a heightened player satisfaction and may incentivize repeat gameplay, potentially boosting revenue for the game operator.

According to the present disclosure, if the server identifies that the elements of the tables are arranged in such a manner that a continuous path is present, spanning over at least two cells, then the server proceeds to determining a gaming outcome. In line with the present disclosure the sever is adapted to determine a length of the continuous path and determine the gaming outcome based on its length.

In a possible embodiment, it may be desirable to implement the operational scheme according to the present disclosure such that the gaming outcome is dependent on if the continuous path is formed as a closed loop or not, where in some embodiments a gaming outcome only is determined (or generated) in case the continuous path is formed as such a closed loop.

Generally, it may be desirable to allow the gaming outcome to have a linear relationship with the length of the continuous path. However, it could optionally be possible to introduce a multiplication factor, meaning that e.g. double the length of the continuous path may provide more than double the gaming outcome. The multiplication factor may be any number, typically above one and upwards. In a possible embodiment the multiplication actor is between 1.1 and 100.

The definition of "adjacently" may be dependent on the specific implementation of the present scheme. For example, adjacently may be defined as arranged on the same row of the table or in the same column of the table. It may however also be possible to allow other cluster formations to be seen as adjacently, such for example comprising a combination of cells arranged both on different columns and on different rows, but at least sharing a side of a cell to another cell holding a matching element. Other definitions of clusters comprising matching elements are of course possible and within the scope of the present disclosure. Such a further example of a cluster may be where matching elements form specific "shapes", but not necessarily share a cell side with each other. Thus, two adjacent cells may possibly, in some embodiments, be seen as two cells at least having "touching" cell corners.

Generally, the cells of the table include four sides, formed as rectangles. However, the cells of the table may have any number of sides from three and upwards. Accordingly, the cells may be shaped as triangles, rectangles/squares, octagons, etc. It could also be possible to combine differently shaped cells in the same table.

For ensuring that the determination of the gaming outcome is performed with a minimum amount of perceived delay in the progression of the game it is desirable to apply a computational efficient predefined segment length determination scheme. Possible schemes that can be used in relation to the present disclosure include different forms of so called graph-based image processing methods that today find usage within e.g. the computer vision field, such as finding paths in images. In some embodiments of the present disclosure the predefined segment length determination scheme may be selected to apply e.g. methods for defining paths and connectedness of the paths. Other predefined segment length determination scheme are also possible and within the scope of the present disclosure.

In some embodiments, the plurality of predefined cluster formations generates different gaming outcomes, where potentially in comparison more "complex" combination of adjacently arranged elements, allowing more than two cells to include segments that are connected in a continuous path. As such, the predefined element types may include segments shaped as a Y, an L, a S, a U, etc.

Generally, it may in some embodiments be preferred to allow the group of the predefined element types to include at least four different element types and wherein the predefined element provides a path between at least two sides of the cell. One example of such an implementation comprises a first element type including at least one linear segment providing a path between two perpendicular sides of the cell, a second element type including one linear segment providing a path between two opposite sides of the cell, a third element type including at least two linear segments providing a path between two opposite sides and one perpendicular side of the cells, and a fourth element type including at least two linear segments providing a path between each of the four sides of the cell. Other elements are of course possible and within the scope of the present disclosure.

In some embodiments of the present disclosure the first game is a game of chance, such as for example a slot game, where the player is placing a bet to be allowed to participate in the game. The gaming outcome may in such an embodiment be dependent on the bet placed by the player.

As indicated above, the server is in charge of controlling the electronic user device to display the table as well as the gaming outcome at the display screen of the electronic user device. In some embodiments the electronic user device is adapted to present a graphical user interface (GUI) at the display screen. The server may in a corresponding manner be adapted to a graphical representation of at least one of the table, the gaming outcome and the updated table, to be distributed to the electronic user device, where the graphical representation is then presented within the GUI.

Such a GUI may also be arranged to allow the player to directly interact with the server, for example allowing the player to control his/her participation in the game as well as to control a size of the bet placed when participating in the game.

Within the context of the present disclosure the expression "forming a graphical representation" should be interpreted broadly. Specifically, it should be understood that the server in some embodiment may be configured to only form a collection of "meta-data" (here corresponding to the graphical representation) that will be rendered at the frontend, such as within the GUI of the electronic user device. However, in another embodiment it may be the other way around, meaning that the server will essentially form an image (here corresponding to the graphical representation) that then will be displayed within the GUI of the electronic user device. Further alternative implementations along the same mutations are possible and within the scope of the present disclosure. Additionally, it may also be possible to allow the graphical representation to be set differently for different game operators, players or groups of players. The graphical representation may also be dependent on e.g. the geographical location of the players, such as dependent on city, country or continent where the player is located/registered.

Within the context of the present disclosure, it should be understood that it in some embodiments so that it may be possible to allow the server to control if a specific electronic user device is to be allowed to apply the scheme according to the present disclosure. Such control may for example be dependent on a geographical location of the electronic user device. Possibly, the geographical location may be selected from a group comprising a city, a country and a continent.

In a possible embodiment of the present disclosure the method further comprises the steps of updating, at the server, the graphical representation of the table to highlight the continuous path, and distributing, from the server to the electronic user device, the updated graphical representation. Accordingly, once the server has determined that there is a continuous path present, it will update the graphical representation that is to be presented to the player. The graphical representation may in this situation possibly include an indication of the gaming outcome.

According to another aspect of the present disclosure there is provided a gaming system comprising a server arranged in communication with an electronic user device using a network connection, the electronic user device comprising a display screen, wherein the server is adapted to form a table having a predetermined dimension and comprising a corresponding number of cells, generate a set of elements corresponding to the number of cells of the table, wherein the set of elements are selected from a group of predefined element types, and each of the predefined element types include at least at least one segment providing a path within the cell, populate the cells of the table with the set of elements, direct the electronic user device to display the table at the display screen, analyze, the populated table to identify if there exist a continuous path connecting at least two adjacently arranged cells of the table, determine, if a continuous path has been identified, a gaming outcome based on a combined segment length of the continuous path determined by applying a predefined segment length determination scheme, and direct the electronic user device to display the gaming outcome. This aspect of the present disclosure provides similar advantages and embodiments as discussed above in relation to the previous aspects of the present disclosure.

Preferably, the gaming system is a cloud-based computing system, and the server is a cloud server. Thus, the computing power provided by means of the invention may be distributed between a plurality of servers, and the location of the servers must not be explicitly defined. Advantageous following the use of a cloud-based solution is also the inherent redundancy achieved.

In some embodiments the electronic user devices may be selected to include e.g. a computer (laptop/stationary), a mobile phone, a tablet, a (gaming) consoles or any other gaming device and gambling terminals. The GUI may in some embodiments be allowed to depend on the type of electronic user device.

According to a still further aspect of the present disclosure there is provided a computer program product comprising a computer readable medium having stored thereon computer program means for operating a gaming system, the gaming system comprising a server arranged in communication with an electronic user device using a network connection, the electronic user device comprising a display screen, wherein the computer program product comprises code for forming, at the server, a table having a predetermined dimension and comprising a corresponding number of cells, code for generating, at the server, a set of elements corresponding to the number of cells of the table, wherein the set of elements are selected from a group of predefined element types, and each of the predefined element types include at least at least one segment providing a path within the cell, code for populating, at the server, the cells of the table with the set of elements, code for directing, using the server, the electronic user device to display the table at the display screen, code for analyzing, at the server, the populated table to identify if there exist a continuous path connecting at least two adjacently arranged cells of the table, code for determining, at the server and if a continuous path has been identified, a gaming outcome based on a combined segment length of the continuous path determined by applying a predefined segment length determination scheme, and code for directing, using the server, the electronic user device to display the gaming outcome. Also this aspect of the present disclosure provides similar advantages and embodiments as discussed above in relation to the previous aspects of the present disclosure.

The computer program product is typically executed using a computing device comprised with the server, preferably including a microprocessor or any other type of computing device. Similarly, a software executed by the server for operating the gaming system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the gaming system may be at least partly automated, implemented as e.g. software, hardware and a combination thereof.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
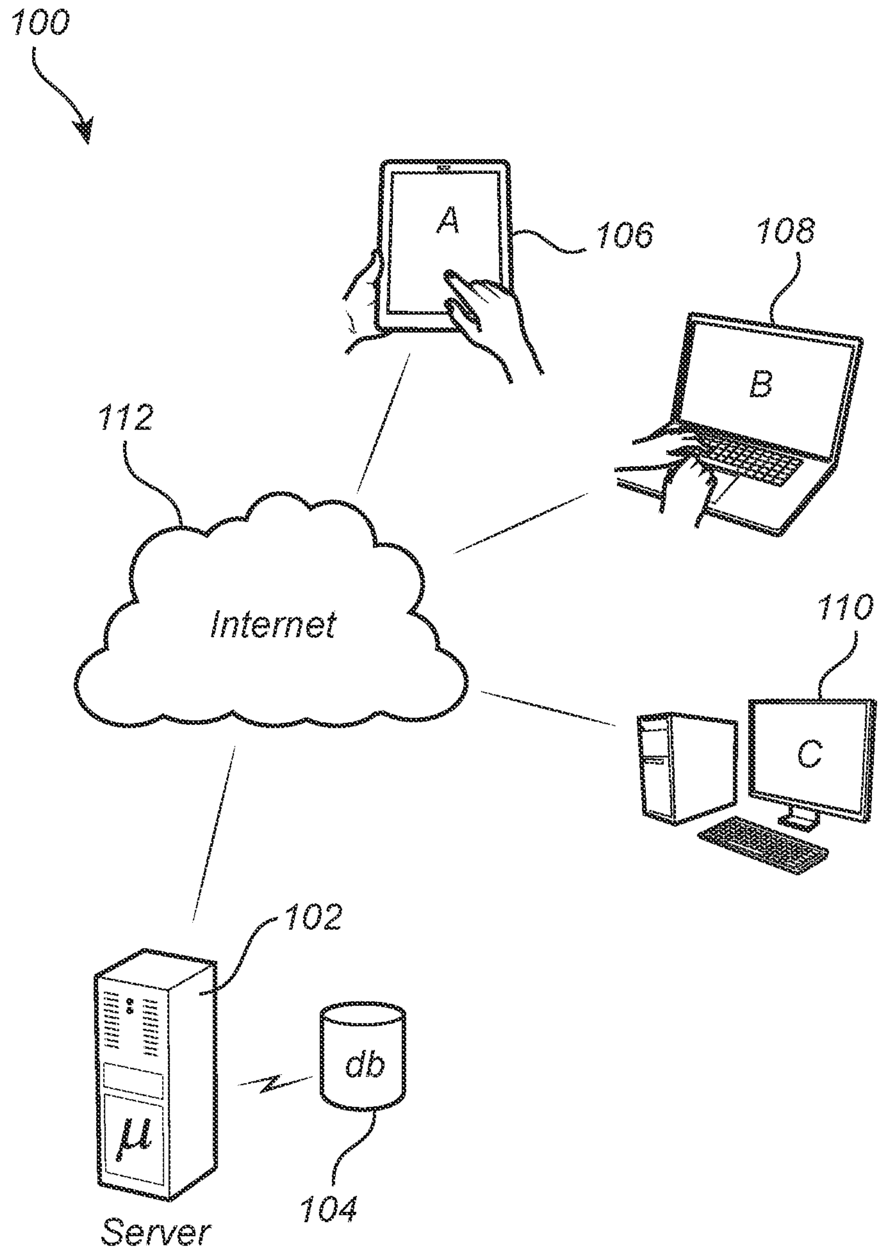
FIG. 1 illustrates an exemplary gaming system according to a currently preferred embodiment of the present disclosure.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness to fully convey the scope of the present disclosure to the skilled addressee. Like reference characters refer to like elements throughout.

Referring now to the drawings and FIG. 1 in particular, there is depicted a gaming system 100 in which an online game, such as a slot game, may be played according to a currently preferred embodiment of the present disclosure. The system architecture illustrated in FIG. 1 depicts a system environment in which systems, methods, apparatus, computer-readable mediums and data structures consistent with the principles of some embodiments of the present disclosure may be included. It may be appreciated that the components of system 100 may be implemented through any suitable combinations of hardware, software, and/or firmware.

As shown in FIG. 1, system 100 includes at least one server 102 and/or at least one gaming database 104. Server 102 and gaming database 104 may be communicably linked to a plurality of electronic user devices in the form of electronic user devices, such as client devices 106, 108, 110, etc. through network 112. The network 112 may be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar. As such, the network 112 may be locally and/or globally provided.

The gaming database 104 may be any type of physical unit on which games reside, such as a machine in a gaming venue, a lottery machine, an electronic game system, etc. Network 112 may be implemented as the Internet, or any local or wide area network, either public or private. Network 112 may also be a hardware system physically connecting some or all of the server 102 and client devices 106, 108, 110. Client devices 106, 108, 110, typically each operated by a player, may be implemented as any computing devices such as a personal computing device, a server, a server network, handheld computing device, slot machine, other gaming machine in a gaming venue such as a betting terminal, a gaming console, lottery machine, an interface in a virtual environment, etc.

It may be appreciated by one of ordinary skill in the art that while only one server, one gaming database, one network and two client devices are depicted, more or fewer servers, more or fewer gaming databases, more networks and more or fewer client devices and/or other devices may reside within system 100.

The elements inside system 100 may include one or more (micro) processors, purpose-built hardware such as, for example, FPGA, ASIC, etc., software systems and applications, software packages, mechanical and electrical parts, etc. Software packages that may be part of server 102, gaming database 104, client devices 106, 108, 110 and network 112 may be recorded on a computer readable medium such as a memory device, RAM, CD/DVD/USB drives, handheld memory device, etc., and/or may be part of a physical device such as one or more (microprocessors or electro-mechanical systems. Any of server 102, gaming database 104, client devices 106, 108, 110, network 112 and further electronic user device 114 may be fixed systems, mobile systems, portable systems, or cloud systems (as discussed above). FIG. 1 shows only three electronic user devices 106, 108, 110, however it should be understood that a general implementation of the present disclosure comprises a large plurality of electronic user devices, possibly greatly above three, such as 100, 1000, 10000, etc.

Although the various components of FIG. 1 are illustrated as discrete elements, it should be recognized that certain operations of some of the various components may be performed by the same physical device, e.g., by one or more microprocessors or other type of devices.

Figure 2:
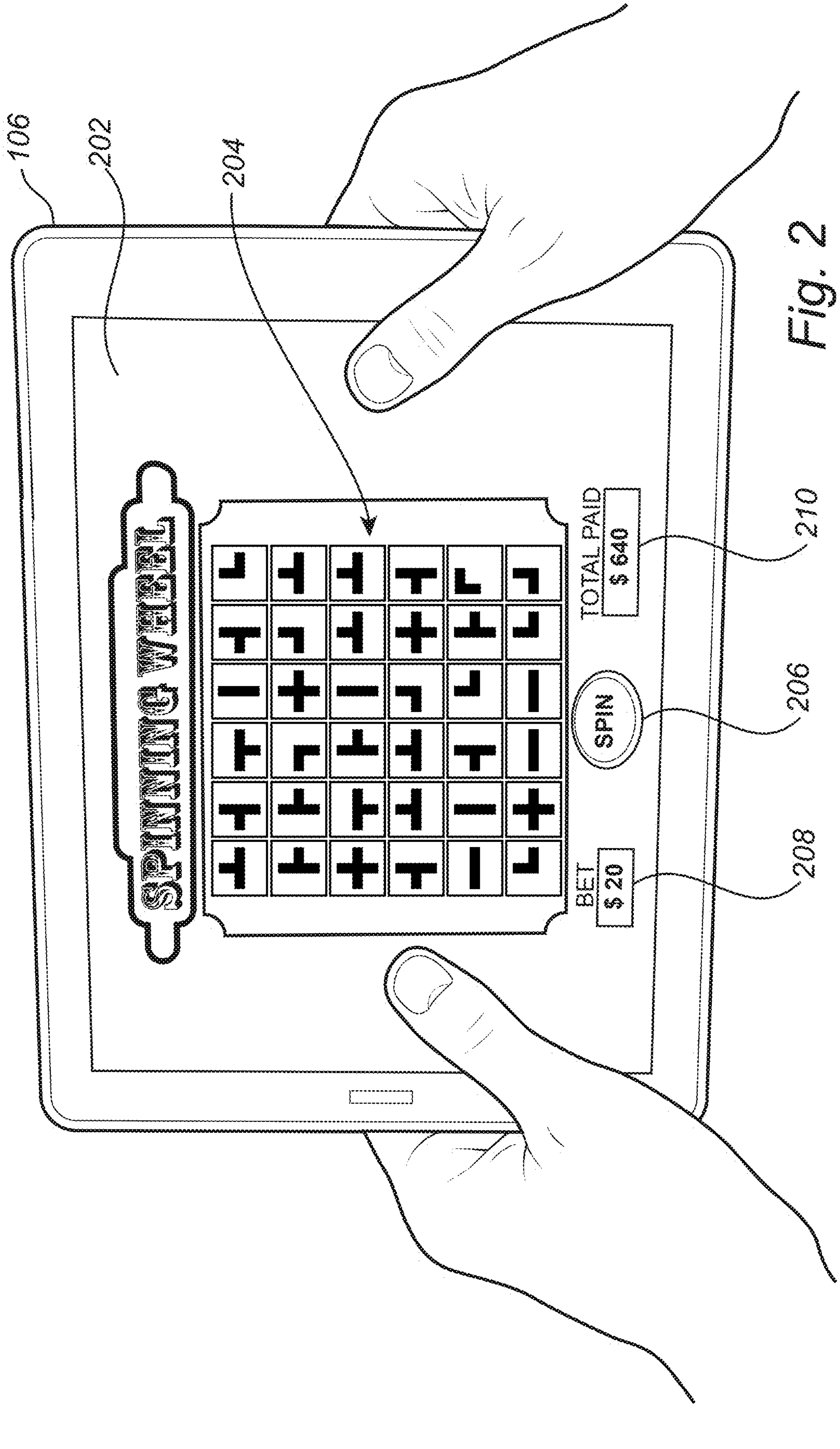
FIG. 2 provides an exemplary illustration of a typical graphical user interface (GUI) for use in playing a game.

Turning now to FIG. 2 illustrating a graphical user interface (GUI) 202 to be displayed at a client device, such as any of the client devices 106, 108, 110, in the illustrated embodiment provided as an application ("app") or within e.g. a web browser of the portable client device 106 being a tablet. The game to be played at the client device 106 is here shown as an online game of chance in the form of a slot game, visualized within the GUI 202 as comprising a table comprising six individual reels 204 arranged in columns and provided with a plurality of different symbols. The table also comprises six rows. As such, the predefined dimension of the table as shown in FIG. 2 is six times six five, thus comprising 36 cells in total.

The GUI also comprises a "button" 206 to start the game, here provided with the description "SPIN" for initiating a turn of the game. In addition, the GUI 202 comprises an indicator of the current bet 208 (i.e. payment for each turn of the game) and an indicator of the total payment to the player 210. It should in any case be understood that other types of games may be played within the scope of the present disclosure, for example being skill based as compared to a game of chance.

As is illustrated in FIG. 2, the plurality of predefined element types includes straight, angled, t-shaped and x-shaped structures, comprising one or a plurality of partial segments (the t-shaped and x-shaped element types are seen as comprising a main segment and one or a plurality of partial segments). The element types can be seen as comprising groups of element types, where each group comprises rotated versions of the same "standard" element types. As an example, a 90-degree angled standard element type may be rotated to form four different element types (belonging to the same group of element types). In FIG. 2, no continuous path is present.

Figure 3A:
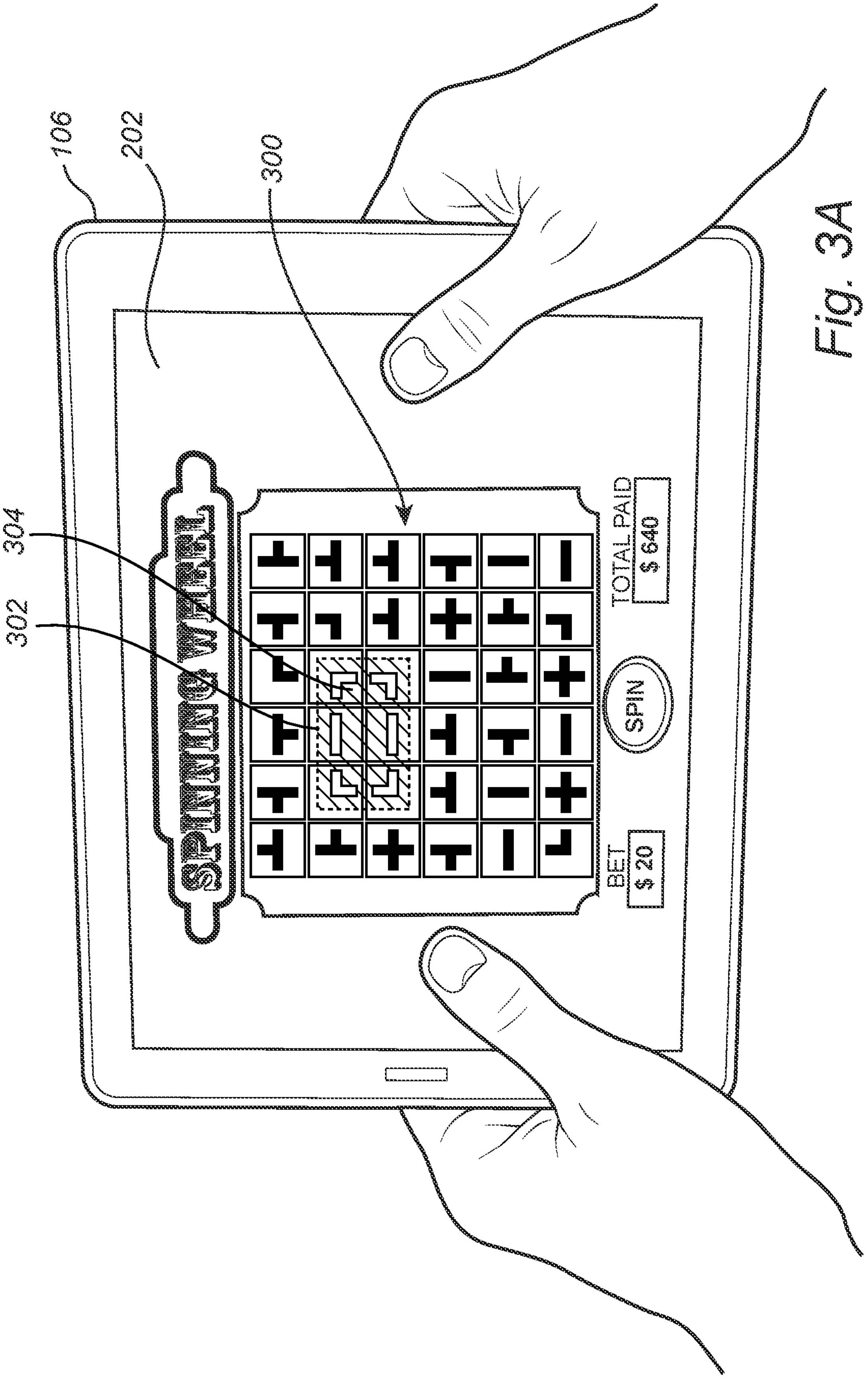
FIGS. 3A and 3B present exemplary illustrations of operations of different tables according to different embodiments of the present disclosure.
Figure 3B:
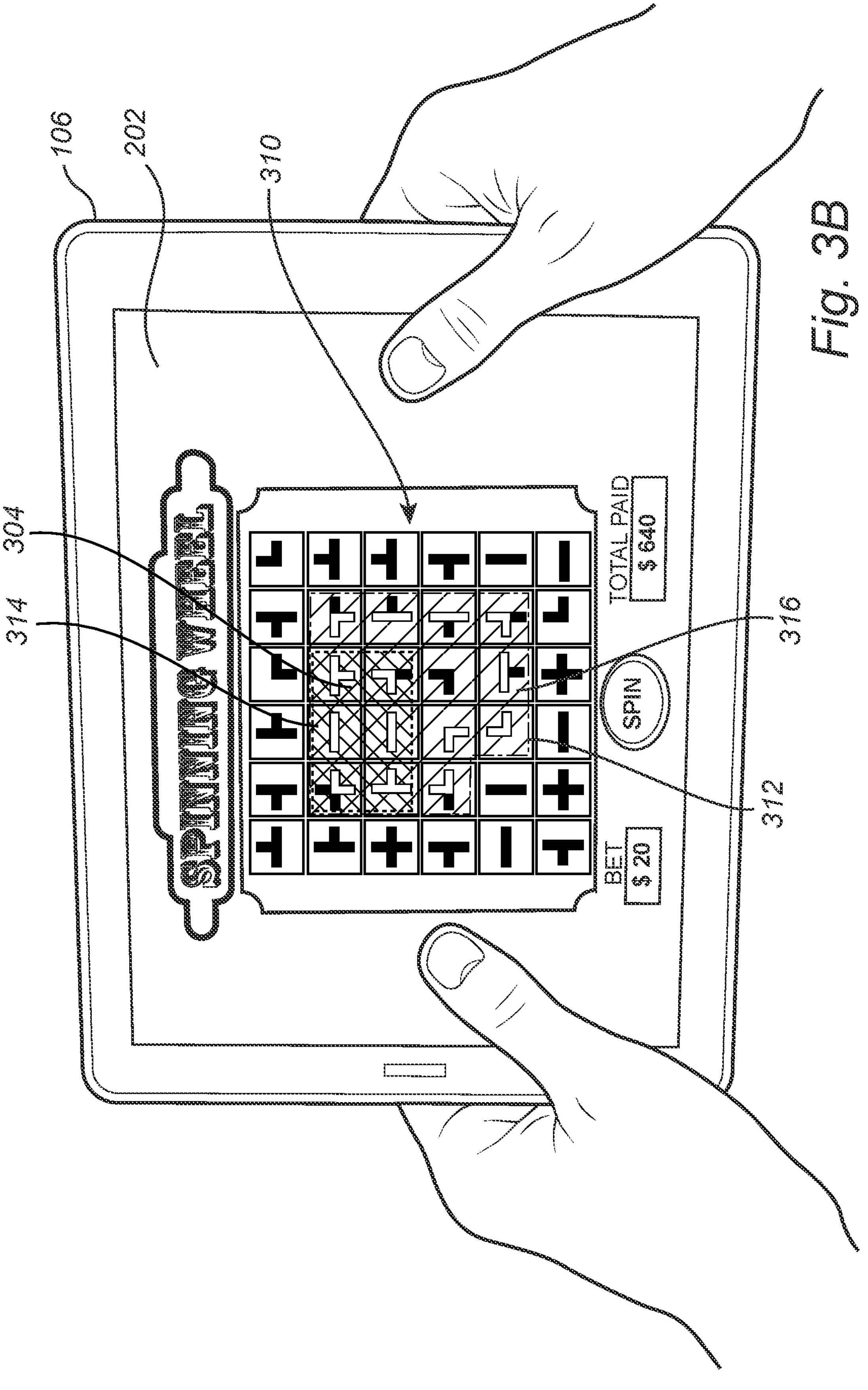
Figure 4:
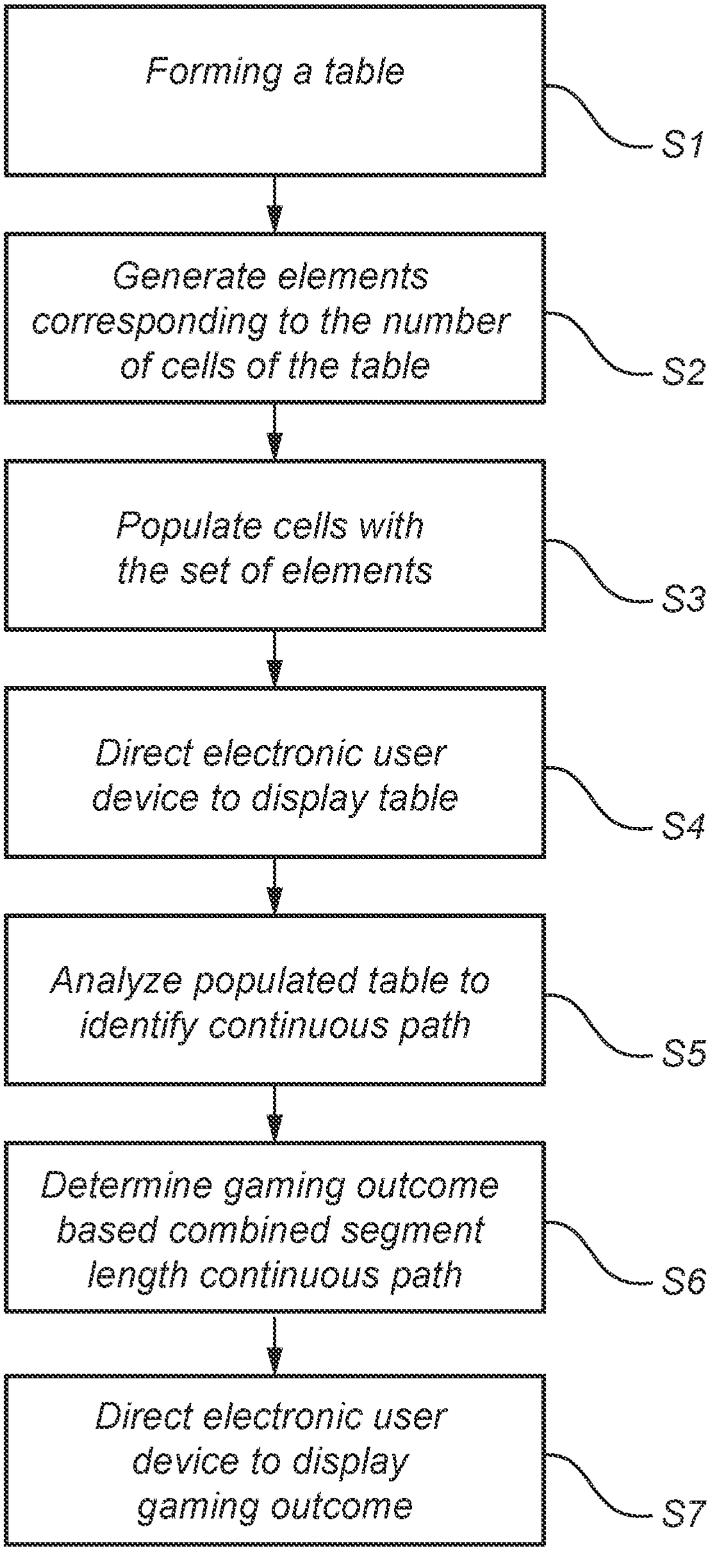
FIG. 4 is a flow chart illustrating the exemplary steps for operating the gaming system as shown in FIG. 1.

Turning now to FIGS. 3A-3B in conjunction with FIG. 4, illustrating different tables according to different embodiments of the present disclosure. In FIG. 3A there is first shown an initial table 300 comprising a plurality of cells 302 arranged in rows and columns, where the table has been formed, s1, by the server 102. The structure of the table 300 in essence corresponds to the table as shown in FIG. 2, e.g. displayable at a display screen of any of the client devices 106, 108, 110.

The server 102 subsequently generates, S2, a set of elements corresponding to the number of cells of the table, wherein the set of elements are selected from a group of predefined element types, and each of the predefined element types include at least one segment providing a path within the cell. The cells of the table 300 are then populated, S3, with the generated set of elements. The server 102 has then directed, S4, e.g. client device 106 to display the populated table 300. In case the game is a game of chance, the elements may be at least semi-randomly generated and similarly the positioning of the elements within the table 300 may be semi-randomly selected.

When the element populated table 300 is in place, the server performs an automated process of analyzing, S5, the populated table to identify if there exist a continuous path connecting at least two adjacently arranged cells of the table 300. As is presented in FIG. 3A, six adjacent cells comprise elements that each comprises segments that matches segments comprised in a directly adjacent cell. The six adjacent cells will here form a continuous path 302 covering the six cells. Also, the continuous path 304 will encircle an area 304 shared by the six adjacent cells.

The server 102 will then, optionally and only if a continuous path has been identified, proceed to determine, S6, a gaming outcome based on a combined segment length of the continuous path determined by applying the above discussed predefined segment length determination scheme. Here the server 102 will track the continuous path shown within the six cells to determine the length, and then base the gaming outcome on the determined length. The general approach according to the present disclosure is to increase a value of the gaming outcome with the length of the continuous path.

Once the server 102 has determined the gaming outcome, the server 102 will proceed to direct, S7, the client device 106 to display the gaming outcome. As such, the player will typically be informed within the display screen of the client device 106 what was "won" due to the identification of a specific type of cluster of elements.

In FIG. 3B a slightly different table 310 is shown, again populated with a new set of elements. As is illustrated in FIG. 3B, 14 cells are here shown to together form a continuous path 312, encircling a first 314 and a second 316 area. Consequently, the combined length of the continuous path 312 is longer than the continuous path 302 as shown in FIG. 3A, and hence the value of the gaming outcome achieved by means of the continuous path 312 will be larger as compared to the gaming outcome achieved by the continuous path 302 of FIG. 3A.

FIGS. 3A and 3B present just two examples of element types and continuous paths possible using such element types. It should be stressed that other element types, e.g. comprising semi-circle, etc. are possible and within the scope of the present disclosure. The general approach of introducing element types that can form continuous paths have in any case shown to be advantageous, since it allows for the application of path identification schemes that are computational efficient. As such, it will by means of the present disclosure be possible to implement complex element types which improves the randomization of the game (as compared to prior-art solutions), while still ensuring that the computational burden at the server is limited and reduced (as compared to what would be needed in case of applying prior-art randomization techniques commonly used in relation to online gaming).

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed present disclosure, from a study of the drawings, the disclosure, and the appended claims. The person skilled in the art realizes that the present disclosure is not limited to the preferred embodiments.

What is claimed is:

1. A computer implemented method performed by a gaming system, the gaming system comprising a server arranged in communication with an electronic user device using a network connection, the electronic user device comprising a display screen, wherein the electronic user device is adapted to present a graphical user interface (GUI) at the display screen, and wherein the method comprises:

forming, at the server, a table having a predetermined dimension and comprising a corresponding number of cells, generating, at the server, a set of elements corresponding to the number of cells of the table, wherein:

the set of elements are selected from a group of predefined element types, and each of the predefined element types include at least one segment providing a path within the cell, populating, at the server, the cells of the table with the set of elements, forming, at the server, a graphical representation of the table, directing, using the server, the electronic user device to render the graphical representation of the table at the GUI of the electronic user device presented at the display screen, analyzing, at the server, the populated table to identify if there exists a continuous path connecting at least two adjacently arranged cells of the table, wherein the continuous path forms a closed loop encircling an area shared by the at least two adjacently arranged cells, determining, at the server and when the continuous path has been identified, a gaming outcome based on a combined segment length of the continuous path determined by applying a predefined segment length determination scheme to identify an aggregated length associated with each of the predefined element types forming the continuous path, generating, at the server, an updated graphical representation comprising instructions to highlight the identified continuous path, and directing, using the server, the electronic user device to render the highlighted continuous path together with the gaming outcome at the GUI of the electronic user device presented at the display screen.

2. The method according to claim 1, wherein the cells include at least three sides.

3. The method according to claim 1, wherein the group of the predefined element types includes at least four different element types and wherein the predefined element provides types provide a path between at least two sides of the cell.

4. The method according to claim 3, wherein the at least four different element types include:

a first element type including at least one linear segment providing a path between two perpendicular sides of the cell, a second element type including one linear segment providing a path between two opposite sides of the cell, a third element type including at least two linear segments providing a path between two opposite sides and one perpendicular side of the cells, and a fourth element type including at least two linear segments providing a path between each of the four sides of the cell.

5. The method according to claim 1, further comprising:

receiving, at the server, a bet from the electronic user device, wherein the determination of the gaming outcome is further dependent on the bet.

6. The method according to claim 1, wherein at least one of the predefined dimension of the table and the predefined element types is selected based on a type of game being executed at the server.

7. A gaming system comprising a server arranged in communication with an electronic user device using a network connection, the electronic user device comprising a display screen, wherein the electronic user device is adapted to present a graphical user interface (GUI) at the display screen, and wherein the server is adapted to:

form a table having a predetermined dimension and comprising a corresponding number of cells, generate a set of elements corresponding to the number of cells of the table, wherein:

the set of elements are selected from a group of predefined element types, and each of the predefined element types include at least at least one segment providing a path within the cell, populate the cells of the table with the set of elements, form a graphical representation of the table, direct the electronic user device to render the graphical representation of the table at the GUI of the electronic user device presented at the display screen, analyze, the populated table to identify if there exists a continuous path connecting at least two adjacently arranged cells of the table, wherein the continuous path forms a closed loop encircling an area shared by the at least two adjacently arranged cells, determine, when the continuous path has been identified, a gaming outcome based on a combined segment length of the continuous path determined by applying a predefined segment length determination scheme to identify an aggregated length associated with each of the predefined element types forming the continuous path, generate an updated graphical representation comprising instructions to highlight the identified continuous path, and direct the electronic user device to render the highlighted continuous path together with the gaming outcome at the GUI of the electronic user device presented at the display screen.

8. The gaming system according to claim 7, wherein the cells include at least three sides.

9. The gaming system according to claim 7, wherein the group of the predefined element types includes at least four different element types, and the at least four different element types include:

a first element type including at least one linear segment providing a path between two perpendicular sides of the cell, a second element type including one linear segment providing a path between two opposite sides of the cell, a third element type including at least two linear segments providing a path between two opposite sides and one perpendicular side of the cells, and a fourth element type including at least two linear segments providing a path between each of the four sides of the cell.

10. The gaming system according to claim 7, wherein at least one of the predefined dimension of the table and the predefined element types is selected based on a type of game being executed at the server.

11. A computer program product comprising a non-transitory computer readable medium having stored thereon computer program means for operating a gaming system, the gaming system comprising a server arranged in communication with an electronic user device using a network connection, the electronic user device comprising a display screen, wherein the electronic user device is adapted to present a graphical user interface (GUI) at the display screen, and wherein the computer program product comprises:

code for forming, at the server, a table having a predetermined dimension and comprising a corresponding number of cells, code for generating, at the server, a set of elements corresponding to the number of cells of the table, wherein:

the set of elements are selected from a group of predefined element types, and each of the predefined element types include at least at least one segment providing a path within the cell, code for populating, at the server, the cells of the table with the set of elements, code for forming, at the server, a graphical representation of the table, code for directing, using the server, the electronic user device to render the graphical representation of the table at the GUI of the electronic user device presented at the display screen, code for analyzing, at the server, the populated table to identify if there exists a continuous path connecting at least two adjacently arranged cells of the table, wherein the continuous path forms a closed loop encircling an area shared by the at least two adjacently arranged cells, code for determining, at the server and when the continuous path has been identified, a gaming outcome based on a combined segment length of the continuous path determined by applying a predefined segment length determination scheme to identify an aggregated length associated with each of the predefined element types forming the continuous path, code for generating, at the server, an updated graphical representation comprising instructions to highlight the identified continuous path, and code for directing, using the server, the electronic user device to render the highlighted continuous path together with the gaming outcome at the GUI of the electronic user device presented at the display screen.

* * * * *